United States Patent
Smith et al.

(10) Patent No.: US 8,924,727 B2
(45) Date of Patent: Dec. 30, 2014

(54) TECHNOLOGIES LABELING DIVERSE CONTENT

(71) Applicant: Intel Corporation, Santa Clara, CA (US)

(72) Inventors: Ned M. Smith, Hillsboro, OR (US); Kenneth T. Layton, Chandler, AZ (US); Michael M. Amirfathi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 13/650,926

(22) Filed: Oct. 12, 2012

(65) Prior Publication Data

US 2014/0108805 A1    Apr. 17, 2014

(51) Int. Cl.
*H04L 9/32* (2006.01)
*G06F 21/64* (2013.01)
*G06F 21/12* (2013.01)

(52) U.S. Cl.
CPC .............. *H04L 9/3234* (2013.01); *G06F 21/64* (2013.01); *G06F 21/128* (2013.01); *G06F 21/126* (2013.01); *H04L 9/3247* (2013.01)
USPC ........... 713/171; 713/156; 713/164; 713/175; 713/176; 726/26; 726/27; 726/28; 726/29; 726/30

(58) Field of Classification Search
None
See application file for complete search history.

(56) References Cited

U.S. PATENT DOCUMENTS

| | | | |
|---|---|---|---|
| 7,373,509 B2 | 5/2008 | Aissi et al. | |
| 7,389,529 B1 * | 6/2008 | Enderwick et al. | 726/1 |
| 2002/0107804 A1 * | 8/2002 | Kravitz | 705/51 |
| 2008/0077994 A1 * | 3/2008 | Comlekoglu | 726/27 |
| 2008/0163336 A1 * | 7/2008 | Feng et al. | 726/1 |
| 2011/0145598 A1 | 6/2011 | Smith et al. | |
| 2011/0145673 A1 * | 6/2011 | Raciborski | 714/750 |
| 2012/0303952 A1 | 11/2012 | Smith et al. | |
| 2013/0139269 A1 * | 5/2013 | Shaikh et al. | 726/26 |

OTHER PUBLICATIONS

Ernie Brickell and Jan Camenisch and Liqun Chen, Direct Anonymous Attestation, Cryptology ePrint Archive, Report 2004/205 2004.*
Schneier, Bruce. Applied Cryptography, Second Edition: Protocols, Algorithms and Source Code in C. New York: Wiley, 1996. Print.*
Brickell et al., "Direct Anonymous Attestation", CCS'04, Oct. 25-29, 2004.
Brickell, et al., "Enhanced Privacy ID: A Direct Anonymous Attestation Scheme with Enhanced Revocation Capabilities", Aug. 17, 2007.
Related U.S. Appl. No. 13/631,881, filed Sep. 29, 2012.

* cited by examiner

*Primary Examiner* — Aravind Moorthy
*Assistant Examiner* — Jason Plotkin
(74) *Attorney, Agent, or Firm* — Grossman, Tucker, Perreault & Pfleger, PLLC (57) ABSTRACT

Technologies for labeling diverse content are described. In some embodiments, a content creation device generates a data structure that may include encrypted diverse content and metadata including at least one rights management (RM) label applying to the diverse content. The RM label may attribute all or a portion of the diverse content to one or more authors. The metadata may also be signed using an independently verifiable electronic signature. A consumption device receiving such a data structure may verify the authenticity of the electronic signature and, if verification succeeds, decrypt the encrypted diverse content in the data structure. Because the metadata is encapsulated with the diverse content in the data structure, it may accompany the diverse content upon its transfer or incorporation into other diverse content.

14 Claims, 6 Drawing Sheets

FIG. 6

TECHNOLOGIES LABELING DIVERSE CONTENT

FIELD

The present disclosure relates to technologies for labeling diverse content. More particularly, the present disclosure relates to technologies that label diverse content in a manner that can preserve the contributions and/or rights of individual authors to that content with independently verifiable electronic indicia.

BACKGROUND

In recent times, interest has grown in the production of diverse content, i.e., content such as audio and/or video media that is the product of contributions from multiple authors. Such diverse content may include, for example, a movie that includes audio produced by a first contributor (or group of contributors) and video that is produced by a second contributor (or group of contributors). Regardless of its nature, the authors contributing to diverse content often wish to have their contribution to such content attributed to them. One purpose of such attribution may be to retain the rights an author might have in his/her contribution to diverse content. Another purpose of such attribution may be to assist the contributor in the enforcement of such rights.

With the rise in digital distribution of content, authors who contribute to diverse media may be increasingly concerned with attribution as a mechanism to maintain and/or enforce rights. This is reflected by the wide use of rights management ("RM") technology to protect digital content. As may be understood in the art, RM technology is a class of access control technologies that may be used by content creators in an attempt to control the use of digital content after it is distributed to a consumer or other third party. For example, RM technology may be used to limit: a user's ability to copy, print, or otherwise share the digital content; the devices on which the digital content may be played; and/or the number of devices on which the digital content may be maintained. RM technology may also be used to provide information about all or a portion of a piece of digital content.

For example, RM technology may be used to generate metadata that includes one or more RM labels, e.g., which identify the name of the author(s), the relevant owners, etc. of all or a portion of a piece of digital content. In this way, metadata may be used in a RM system to attribute various portions of diverse content to one or more authors/owners. Such attribution may later be used by the author and/or owner to enforce his or her rights in the relevant portion of the diverse content.

While metadata may be used to attribute portions of diverse content to relevant authors (e.g., through the use of metadata), in many instances such metadata (or the RM labels provided therein) are assigned after the diverse media is created, e.g., in a clearing house environment. In such instances, the metadata and/or RM labels may be created in a process that is separate from and/or remote in time from the creation of the content in question. Returning to the movie example, metadata containing RM labels may be generated by a clearing house to attribute portions of the movie (audio, video, etc.) to relevant authors after the entire movie is assembled. Such a process can be inefficient and may result in the omission of appropriate attribution to aspects of the diverse content (movie). Furthermore, metadata and/or RM labels generated in this manner may be lost if that diverse content is incorporated into other diverse content.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following detailed description will proceed with reference being made to illustrative embodiments, many alternatives, modifications, and variations thereof will be apparent to those skilled in the art.

DETAILED DESCRIPTION

While the present disclosure is described herein with reference to illustrative embodiments for particular applications, it should be understood that such embodiments are exemplary only and that the invention as defined by the appended claims is not limited thereto. Those skilled in the relevant art(s) with access to the teachings provided herein will recognize additional modifications, applications, and embodiments within the scope of this disclosure, and additional fields in which embodiments of the present disclosure would be of utility.

Generally, the present disclosure provides systems, methods and devices for labeling diverse content. As will be described in detail below, the systems, methods and devices of the present disclosure can provide a mechanism wherein metadata including RM labels is generated in the course of creating diverse content. The metadata may be embedded in a data structure that includes the diverse content, such that the metadata accompanies the diverse content in the event the data structure is transferred to a third party and/or used in other content. Likewise, the metadata may be provided in such a manner that its authenticity may be independently verified by a consumption device.

As used herein, the term "diverse content" is used to refer to content such as audio, video, imagery, text, markup, pictures, metadata, hyperlinks, encrypted, signed, encoded data, source code, RM content and combinations thereof and the like, which is the product of contributions from multiple authors. Diverse content may therefore include a compilation and/or mash-up of content elements (which may each be audio, video, imagery, text, markup, etc. combinations thereof and the like) that are organized or arranged in a desired fashion. As may be appreciated, diverse content may include content elements that are attributable to the creator of the diverse content, as well as content elements that are attributable to others.

The technologies of the present disclosure may be implemented using one or more devices. As used herein, the terms "device" and "devices" refer individually and/or collectively to any of the large number of electronic devices that may be used to create diverse content and/or consume diverse content. Non-limiting examples of devices that may be used in accordance with the present disclosure include any kind of mobile device and/or non-mobile device, such as cameras, cell phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, ultra-mobile personal computers, wired telephones, combinations thereof, and the like. Such devices may be portable or stationary. Without limitation, the devices described herein are preferably in the form of one or more cell phones, desktop computers, laptop computers, servers, smart phones and tablet personal computers.

The term "content creation device" is used herein to refer to a device (or collection of devices) that may be used to produce diverse content in a manner consistent with the present disclosure. In contrast, the term "consumption device" is used herein to refer to a device (or collection of devices) on or with which a user may consume diverse content. It should be understood that the terms "content creation device" and "consumption device" are used herein for the sake of clarity only, and that any of the content creation devices described herein may be capable of acting as a consumption device, and vice versa.

The terms "RM label" and "RM labels" are used herein to refer to one or more parameters that may be used to identify and/or define rights in all or a portion of diverse content. For example, a RM label may identify the author/owner of all or a portion of diverse content, one or more limits on the use of all or a portion of diverse content, combinations thereof and the like. Without limitation, RM labels preferably identify the author/owner of all or a portion of diverse content with which metadata including the RM label is associated.

For the sake of clarity, many of the FIGS. illustrate exemplary systems in accordance with the present disclosure as including a single content creation device and a single consumption device. It is emphasized that such illustrations are exemplary only, and that any number of content creation devices and consumption devices may be used. Indeed, the present disclosure envisions systems in which a plurality (e.g., 1, 5, 10, 20, 50, 100 or more) devices are used as content creation devices and/or consumption devices. Thus, while the present disclosure may refer to a content creation device and/or a consumption device in the singular, such expressions should be interpreted as also encompassing the plural form.

As used in any embodiment herein, the term "module" may refer to software, firmware and/or circuitry configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry that forms a part of one or more devices, as defined previously.

Figure 1:
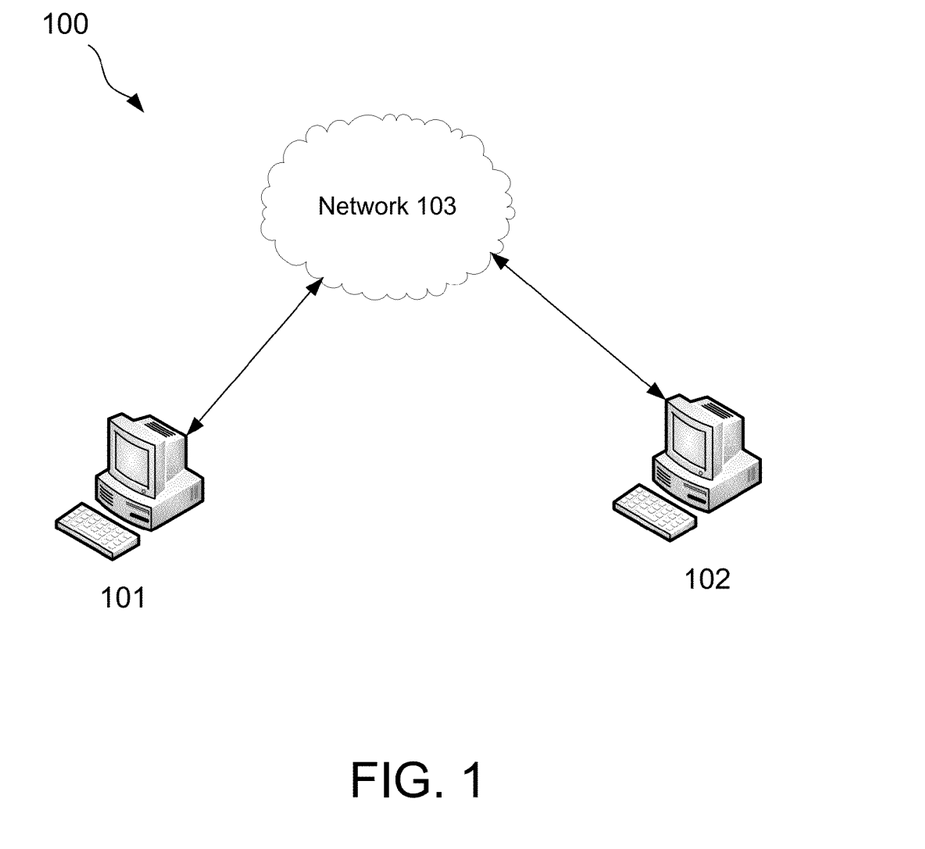
FIG. 1 depicts an exemplary system for creating and consuming diverse content consistent with non-limiting embodiments of the present disclosure.

FIG. 1 illustrates one non-limiting example of a system in accordance with the present disclosure. As shown, system 100 includes content creation device 101 and consumption device 102. As will be described in detail later, content creation device 101 may be capable of producing and/or labeling diverse content in a manner consistent with the present disclosure, whereas consumption device 102 may be configured to permit a user to consume diverse content produced and/or labeled by content creation device 101.

In this regard, consumption device 102 may receive diverse content in any suitable fashion. The embodiment of FIG. 1 illustrates an exemplary system wherein content creation device 101 and consumption device 102 are connected via network 103. Network 103 may be any type of network that is capable of transferring data between content creation device 101 and consumption device 102. For example, network 103 may be a long range communication network, short range communication network, or a combination thereof.

The phrase "short range communication network" is used herein to refer to technologies for sending/receiving data signals between devices that are relatively close to one another. Close range communication includes, for example, communication between devices using a BLUETOOTH™ network, a personal area network (PAN), near field communication, a ZigBee network, a wired Ethernet connection, combinations thereof, and the like. In contrast, the phrase "long range communication" is used herein to refer to technologies for sending/receiving data signals between devices that are a significant distance away from one another. Long range communication includes, for example, communication between devices using a WiFi network, a wide area network (WAN) (including but not limited to a cell phone network (3G, 4G, etc. and the like), the internet, telephony networks, combinations thereof, and the like.

Of course, consumption device 102 need not receive diverse content via network 103. Indeed, consumption device 102 may receive diverse content in some other fashion, e.g., from a third party device, a data storage medium, and combinations thereof. For example, consumption device 102 may receive diverse content from an internet (cloud) server, from a media storage device (e.g., a flash drive, universal serial bus storage device, a portable magnetic recording medium, etc.), combinations thereof and the like.

In any case, the content creation devices and consumption devices of the present disclosure may be configured to provide one or more resources for creating and/or consuming diverse content in a manner that protects and/or maintains RM labels assigned to portions of the diverse content. For example, the content creation devices and content consumption devices may include one or more protected environments for the execution of operations consistent with the present disclosure.

As one example of a protected environment that may be used in the devices of the present disclosure, mention is made of memory enclave technology, such as INTEL™ secure enclave technology. As may be appreciated, a memory enclave is made up of at least one memory page that has a different access policy than the access policy imposed by traditional ring boundaries of a computing system. The memory page(s) within a memory enclave may have associated read/write controls, which may be configured such that the read/write controls have exclusivity over certain operating modes or privilege "rings", system management mode or virtual machine monitors of an associated processor. In some embodiments of the present disclosure, a content creation and/or consumption device may use one or more memory enclaves to store encrypted/unencrypted diverse content, metadata associated with the diverse content, one or more encryption keys and/or signature keys, combinations thereof, and the like, as will be discussed later.

Another example of a protected environment that may be used in the devices of the present disclosure is a trusted execution environment (TEE). As will be understood by those skilled in the art, a TEE is a secure environment that runs alongside an operating system and which can provide secure services to that operating system. More information regarding TEEs and the implementation thereof may be found in the TEE client application programming interface (API) specification v1.0, the TEE internal API specification v1.0, and the TEE system architecture v1.0 issued by GlobalPlatform. In some embodiments, a TEE may be provided using one or more of virtualization technology and security co-processor technology. Non-limiting examples of such technology include INTEL™ VT-x virtualization technology, INTEL™ VT-d virtualization technology, INTEL™ trusted execution technology (TXT), converged security engine (CSE) technology, converged security and manageability engine (CSME) technology, a security co-processor, manageability engine, trusted platform module, platform trust technology, ARM TRUSTZONE® technology, combinations thereof, and the like. The nature, advantages and limitations of each of these technologies are well understood, and therefore are not described herein. In some embodiments of the present disclosure, TEEs on a content creation device and a consumption device may be leveraged to execute certain operations consistent with the present disclosure, as will be described later.

The content creation devices and consumption devices of the present disclosure may include one or more of a metadata generation module (MGM) and a metadata verification module (MVM). The MGM and MVM may be configured to permit and/or cause the execution of metadata generation operations and metadata verification operations, respectively. For example, the MGMs described herein may permit and/or cause a content creation device to encrypt diverse content, to generate metadata associated with the diverse content that includes one or more RM labels, and/or to sign the metadata with a digital signature that may be independently authenticated by a consumption device. The MGMs described herein may also permit and/or cause a content creation device to produce a data structure that encapsulates the encrypted diverse content with the signed metadata describing that diverse content (hereinafter, "associated metadata").

Similarly, the MVMs described herein may permit and/or cause a consumption device, in response to the receipt of a data structure containing encrypted data and signed metadata, to verify the authenticity of the signed metadata. If the verification succeeds, the MVMs may further permit and/or cause a consumption device to decrypt encrypted diverse content associated with the metadata. If the verification fails, the MVMs may cause the consumption device to reject and/or refuse to decrypt the encrypted diverse content.

Figure 2:
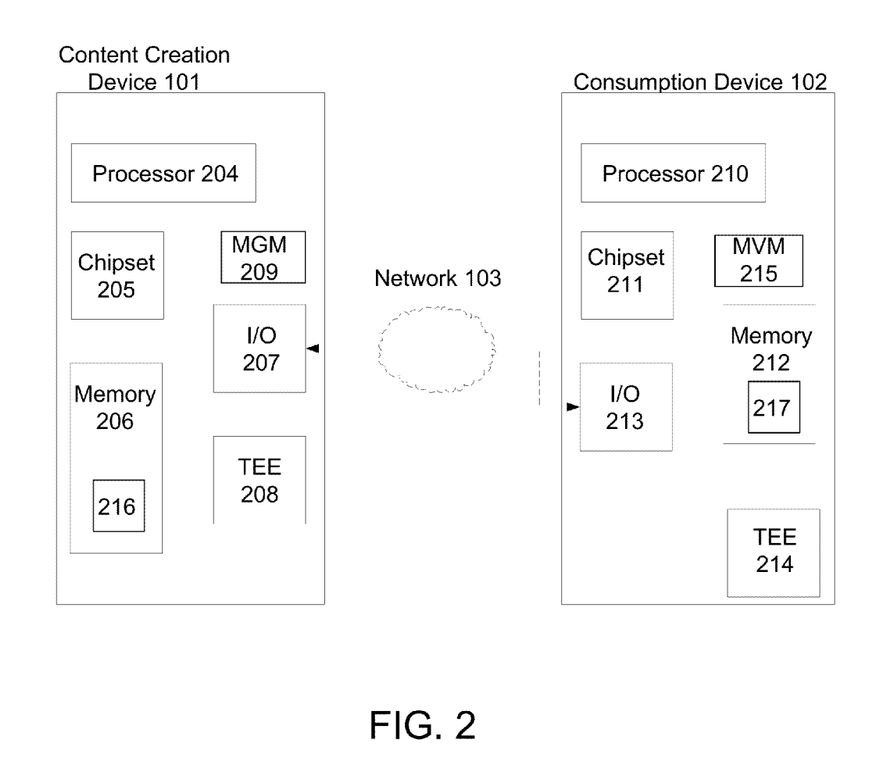
FIG. 2 is a block diagram of an exemplary content creation device and a consumption device consistent with non-limiting embodiments of the present disclosure.

Reference is now made to FIG. 2, which illustrates exemplary configurations for a content creation device 101 and a consumption device 102 consistent with the present disclosure. For the sake of simplicity and ease of understanding, the embodiment of FIG. 2 is illustrated with only a single content creation device 101 and consumption device 102, which have many of the same general components. Specifically, content creation device 101 and consumption device 102 each include a processor (i.e., processor 204, 210), a chipset (i.e., chipset 205, 211) a memory (i.e., memory 206, 212), input/output (I/O) interface (i.e., I/O 207, 213), and a trusted execution environment (i.e., TEE 208, 214).

Processors 204, 210 may be any suitable processor, including but not limited to general purpose processors and application specific integrated circuits. Such processors may be capable of executing one or multiple threads on one or multiple processor cores. Without limitation, processors 204, 210 are preferably general purpose processors, such as but not limited to the general purpose processors commercially available from Intel Corp. and Advanced Micro Devices (AMD). Furthermore, while the FIG. 2 illustrates a content creation device and a content consumption device containing a single processor, multiple processors may be used. For example, where a metadata generation module (MGM) and/or metadata verification module (MVM) are used and include computer readable instructions, such instructions may be executed on at least one processor (e.g., 2, 3, 4, 6, 7 etc. processors to perform operations consistent with the present disclosure (e.g., metadata generation operations and metadata verification operations).

Chipset 205, 211 may include circuitry that is appropriate for the platform of content creation device 101 and consumption device 102, respectively. For example, where content creation device 101 and consumption device 102 are a desktop computer and a notebook computer, respectively, chipset 205 and chipset 211 may respectively include circuitry suitable for a desktop computer platform and a notebook computer platform. In any case, circuitry within chipsets 205, 211 may include integrated circuit chips, such as but not limited integrated circuit chips commercially available from Intel Corp. Of course, other types of integrated circuit chips may also be used.

Memory 206, 212 may be any suitable type of computer readable memory. Examples of such memory include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, computer readable media may include other and/or later-developed types of computer-readable memory.

All or a portion of memory 206 and/or 212 may be configured to provide enhanced security for content creation and/or consumption operations consistent with the present disclosure. For example, all or a portion of memory 206 and/or 212 may be configured to include a memory enclave. This concept is illustrated in FIG. 2, wherein memory 206 and memory 212 respectively include memory enclave 216 and 217, as previously described. In some embodiments, one or both of memory enclave 216 and/or 217 is/are provided using INTEL™ secure enclave technology. Of course, other mechanisms for provisioning memory enclave 216 and 217 in memory 206 and 212 may be used, and are envisioned by the present disclosure. Moreover, it should be understood that memory enclaves 216 and/or 217 need not be provisioned within memory 206, 212, respectively. Indeed, such enclaves may be provisioned within memory that is separate from memory 206, 212. For example, memory enclaves 216, 217 may be provisioned within memory local to processor 204, 210, respectively, within memory local to TEE 208, 214, combinations thereof, and the like.

I/O 207 may include hardware (i.e., circuitry), software, or a combination of hardware and software that allows content creation device 101 to output data structures encapsulating diverse content and metadata consistent with the present disclosure. Likewise, I/O 213 may include hardware (i.e., circuitry), software, or a combination of hardware and software that allows consumption device to receive such data structures. For example, I/O 207 may transmit data structures containing diverse content and metadata to I/O 213, e.g., via network 103, as previously described. Thus, I/Os 207, 213 may communicate using via close and/or long range communication, e.g., using a predefined communications protocol. For example, I/Os 207, 213 may include one or more transponders, antennas, BLUETOOTH™ chips, personal area network chips, near field communication chips, combinations thereof, and the like. Alternatively or additionally, I/O 207 may be configured to permit the export of diverse content to one or more third party devices, such as a remote server, a data storage medium (e.g., a magnetic recording medium, optical recording medium, magneto-optical recording medium, a solid state recording medium, etc.), combinations thereof, and the like. In such instances, I/O 213 may be configured to permit the receipt of diverse content via such third party device(s).

In FIG. 2, content creation device 101 and consumption device 102 are each illustrated as including a trusted execution environment, namely TEE 208 and TEE 214, respectively. Without limitation, TEE 208 and/or TEE 214 are provisioned using one or more of virtualization technology and/or security coprocessor technology, as previously described.

FIG. 2 further illustrates content creation device 101 as including metadata generation module (MGM) 209, and consumption device 102 as including metadata verification module (MVM) 215. For the sake of illustration, MGM 209 and MVM 215 are illustrated as components that are separate from other elements of content creation device 101 and consumption device 102, respectively. The illustrated configuration may be suitable, for example, when MGM 209 and MVM 215 are each in the form of a hardware module such as a security processor (e.g., trusted platform module, manageability engine, etc.). Of course, such configuration is exemplary only, and MGM 209 and MVM 215 may be respectively provisioned on content creation device 101 and consumption device 102 in any suitable manner. For example, one or both of MGM 209 and MVM 215 may be provisioned in the form of computer readable instructions that when executed by processor 204, 210, respectively, cause client 101 and/or service provider 102 to perform operations consistent with the present disclosure. In this regard, MGM 209 and/or MVM 215 may be provisioned within a memory, e.g., memory 206, 215, memory that is local to processors 204, 210, memory within a TEE, or another memory.

MGM 209 may be configured to permit and/or cause the execution of metadata generation operations with resources of content creation device 101. Without limitation, such operations may include encrypting diverse content with one or more data encryption keys, encrypting data encryption keys with one or more key encryption keys (KEKs), generating metadata that includes one or more RM labels, signing the metadata with an independently verifiable electronic signature, and outputting a data structure that encapsulates the encrypted diverse content and the signed metadata.

For example, MGM 209 may be in the form of instructions that when executed by processor 204 may cause content creation device to transfer diverse content within memory 206 (e.g., within memory enclave 216) to TEE 208. MGM 209 when executed may further cause TEE 208 to encrypt the diverse content using a data encryption key, thereby producing encrypted diverse content. While any type of data encryption key may be used, for the sake of example the present disclosure will continue based on an embodiment wherein the data encryption key is a symmetric encryption key that may be later used by consumption device 102 to decrypt the encrypted diverse content for consumption.

In addition to causing TEE 208 to encrypt the diverse content, MGM 209 when executed may further cause TEE 208 to wrap (encrypt) the data encryption key with another key. In this regard, any key wrapping process (symmetric, asymmetric, or otherwise) may be used. But for the sake of example, the present disclosure will continue based on an embodiment wherein TEE 208 wraps the data encryption key using an asymmetric key wrapping protocol. Thus, for example TEE 208 may wrap the data encryption key with a private key encryption key (KEK), thus producing a wrapped data encryption key. As will be described later, the wrapped data encryption key may in this embodiment be unwrapped by consumption device 102 using a public key corresponding to content creation device's private KEK.

Alternatively or in addition to the foregoing operations, MGM 209 when executed may cause content creation device 101 to produce metadata including one or more RM labels that describe the diverse content. For example, the metadata may include RM labels that attribute all or a portion of the diverse content to one or more authors. Alternatively or additionally, the metadata may include RM labels that impose one or more controls on the use of all or a portion of the diverse content, as previously described.

The metadata describing the diverse content may be generated prior to, simultaneously with, or subsequent to the creation of the diverse content. Without limitation, in some embodiment the metadata describing the diverse content is generated simultaneously with or near-in-time to the creation of the diverse content. As used herein, the term "near-in-time" when used in the context of metadata generation means within a reasonable time period following the creation of diverse content, e.g., which may range from one or more seconds, minutes, hours, or even days, depending on the circumstances. Without limitation, metadata describing diverse content is generated simultaneously with the creation of diverse content.

The metadata describing the diverse content may be created and stored within any part of content creation device 101. In some embodiments, the metadata is created within memory enclave 216 of memory 206. In such embodiments, the security of the metadata may be enhanced, due to the properties of memory enclave 216.

MGM 209 when executed may further cause content creation device 101 to sign the metadata describing the diverse content with a private identification key used in an electronic identification signature protocol. As non-limiting examples of such signature protocols, mention is made of the electronic signatures used in Intel's Enhanced Privacy Identification (EPID) protocol, the direct autonomous attestation (DAA) protocol, combinations thereof, and the like. As may be appreciated, EPID is a specialization of DAA with enhanced revocation properties. Details regarding the EPID and DAA protocols may be found in E. Brickell and Jiangtao Li, "Enhanced Privacy ID: A Direct Anonymous Attestation Scheme with Enhanced Revocation capabilities," Aug. 17, 2007 and Brickell et al., "Direct Autonomous Attestation," 11th ACM Conference on Computer and Communications Security, Oct. 25-29, 2004. Generally, EPID and DAA permit data to be signed with a private identification key (e.g., an EPID private key) that is unique to one device, and which may be verified using a corresponding public key (e.g., an EPID public key) that is distributed among various other devices. In some embodiments, the public key used to verify the private identification key may be stored in a trusted execution environment of a consumption device, as will be described later.

In some embodiments, MGM 209 when executed causes content creation device 101 to sign the metadata describing the diverse content using the EPID signature protocol. In this regard, it may be understood that content creation device 101 may be supplied with a private EPID key that is unique to it, and which is not known to consumption device 102. In addition, both content creation device 101 and consumption device 102 may be supplied with a public EPID key that may be used to verify the authenticity of private EPID keys associated with the public EPID key—in this case, the content creation device 101's private EPID key. The private and public keys may be safeguarded within a secure environment within content creation device 101 and/or consumption device 102.

For example, content creation device 101's EPID private key may be maintained within TEE 208. Likewise, the public EPID key corresponding to content creation device 101's EPID private key may be maintained in TEE 214 of consumption device 102. In such instances, MGM 209 when executed may cause content creation device 101 to supply the metadata (e.g., from memory enclave 216) to TEE 208. MGM 209 when executed may further cause TEE 208 to sign the metadata with content creation device 101's EPID private key, thereby producing signed metadata.

Figure 3:
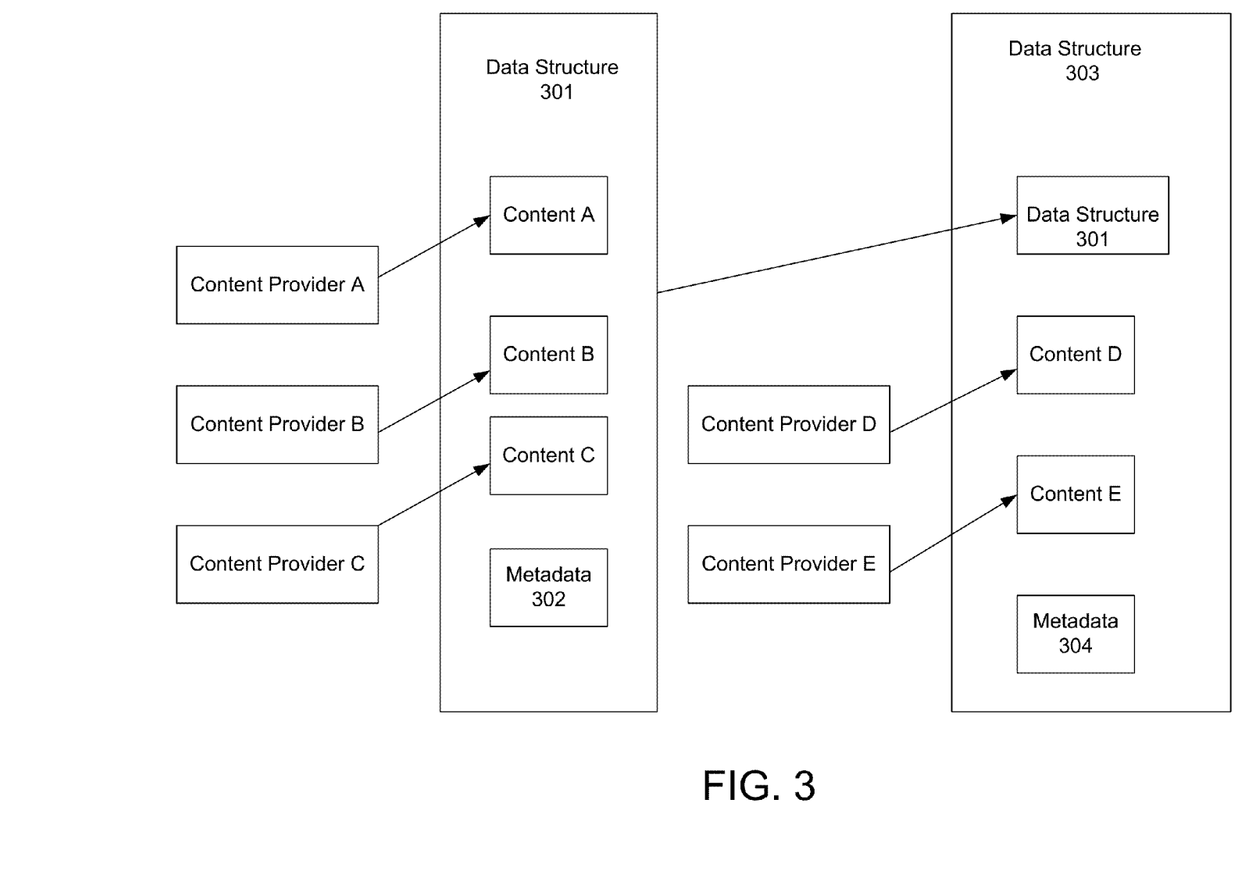
FIG. 3 is a block diagram illustrating the creation of two exemplary data structures that encapsulate diverse content and metadata, consistent with non-limiting embodiments of the present disclosure.

At this point, MGM 209 when executed may cause content creation device 101 to package the encrypted diverse content and signed metadata for output. In some embodiments, MGM 209 when executed causes content creation device to produce a data structure that encapsulates both the encrypted diverse content and the signed metadata. This concept is illustrated in FIG. 3, which depicts the production of two user data structures consistent with the present disclosure, namely data structure 301 and data structure 303. As illustrated, data structure 301 includes encrypted content from three content providers, A, B, and C. Content A, content B, and content C may be encrypted by a first content creation device consistent with the present disclosure (e.g., using a first symmetric data encryption key) and encapsulated within data structure 301.

Data structure 301 further includes metadata 302. Among other things, metadata 302 may describe the content of data structure 301 and includes one or more RM labels in association with content A, B, and/or C. For example, metadata 302 may include one or more RM labels that attribute content A, B, and/or C to content provider A, B, and/or C, respectively. In any case, metadata 302 may be generated and signed by the first content creation device, e.g., with the first content creation device's EPID private key. In this way, data structure 301 encapsulates both the encrypted diverse content and its associated (signed) metadata 302.

Data structures produced by content creation devices in accordance with the present disclosure may be transferred as a unit to other devices (e.g., consumption devices), and/or incorporated as a unit into other diverse content. This concept is illustrated in FIG. 3 by the production of data structure 303, which encapsulates data structure 301 (including its encrypted diverse content and metadata 302) with content from additional content providers, i.e., content D and content E. Like content A, B, and C of data structure 301, content D and E may be encrypted by a content creation device (e.g., with a second symmetrical data encryption key) prior to being incorporated in data structure 303.

In addition, data structure 303 may include metadata 304 which, like metadata 302, describes the content of data structure 303. Metadata 302 may also include information about data structure 301, as well as one or more RM labels in association with content D and content E. For example, metadata 304 may include one or more RM labels that attribute content D and content E to content provider D and content provider E, respectively. Like metadata 302, metadata 304 may be signed by a content creation device. For example, where data structure 303 is produced by a second content creation device, metadata 304 may be signed using the second content creation device's EPID private key. In such instances, the first and second content creation device's respectively EPID private keys may be associated with the same EPID public key. As a result, another device (e.g., a consumption device) may verify the authenticity of both metadata 304 and metadata 302 (as encapsulated in data structure 303) using a single EPID public key.

Returning to the embodiment of FIG. 2, MVM 215 may be configured to permit and/or cause the execution of metadata verification operations consistent with the present disclosure. Without limitation, such metadata verification operations may include verifying the authenticity of metadata contained in data structures produced by a content creation device. If such verification succeeds, such operations may further include decrypting (unwrapping) the encryption key(s) that was (were) used to encrypt diverse content in the data structure, and decrypting the diverse content using the decrypted data encryption key(s). If verification fails, such operations may include rejecting or otherwise terminating the decryption of the diverse content.

For example, MVM 215 may be in the form of instructions that when executed by processor 210 cause consumption device 102 to, in response to receiving a data structure produced by a content creation device, transfer the data structure to a secure environment. For example, MGM 215 when executed may cause consumption device 102 to transfer data structures received with I/O 213 to memory enclave 217.

MVM 215 when executed may further cause consumption device 102 to authenticate the electronic signature applied to the metadata included in the data structure. For example, MVM 215 when executed may cause consumption device 102 to transfer signed metadata included in the data structure from a secure environment (e.g., memory enclave 217) to TEE 214. TEE 214 may store a public identification key that corresponds to the private identification key that was used by a content creation device to sign the metadata in question. For example, where the content creation device 101 signs the metadata with its DAA/EPID private key, TEE 214 may store a corresponding DAA/EPID public key, which may have been previously provided to TEE 214, e.g., when consumption device 102 was manufactured, or obtained from a third party verification service. In any case, MVM 215 when executed may cause TEE 214 to verify the authenticity of the signed metadata (e.g., the DAA/EPID private key signature) using its public identification key (e.g. a DAA/EPID public key).

If the verification fails, MVM 215 may cause consumption device to reject a data structure, or otherwise refuse to decrypt diverse data included in such data structure. But if the verification succeeds, MVM 215 when executed may cause consumption device 102 to perform additional operations. For example, MVM 215 when executed may cause consumption device to unwrap the wrapped (encrypted) data encryption key(s) that was (were) used by the content creation device to encrypt the diverse content included in the data structure. As noted above, TEE 208 may wrap the data encryption key with a private key encryption key (KEK), thus producing a wrapped data encryption key. In such instances, MVM when executed may cause consumption device 102 to decrypt the wrapped data encryption key using an asymmetric public key cryptography process. For example, the private KEK used to wrap the data encryption key may correspond to a public key that was previously provided to consumption device 102, and which may be used to decrypt the wrapped data encryption key. The wrapped data encryption key may be provided to the consumption device 102 in any suitable manner, e.g., with data structure 301, using an asymmetric key exchange protocol (e.g., Diffie-Hellman), combinations thereof, and the like.

In addition, MVM when executed may cause consumption device 102, upon unwrapping the data encryption key(s) used to encrypt the diverse content included in a data structure, to decrypt the diverse content using such data encryption key(s). For example, where content creation device encrypts the diverse content with a symmetric key, consumption device 102 may obtain the symmetric key by decrypting the wrapped data encryption key (as discussed above), and use the symmetric key to decrypt the diverse content.

Figure 4:
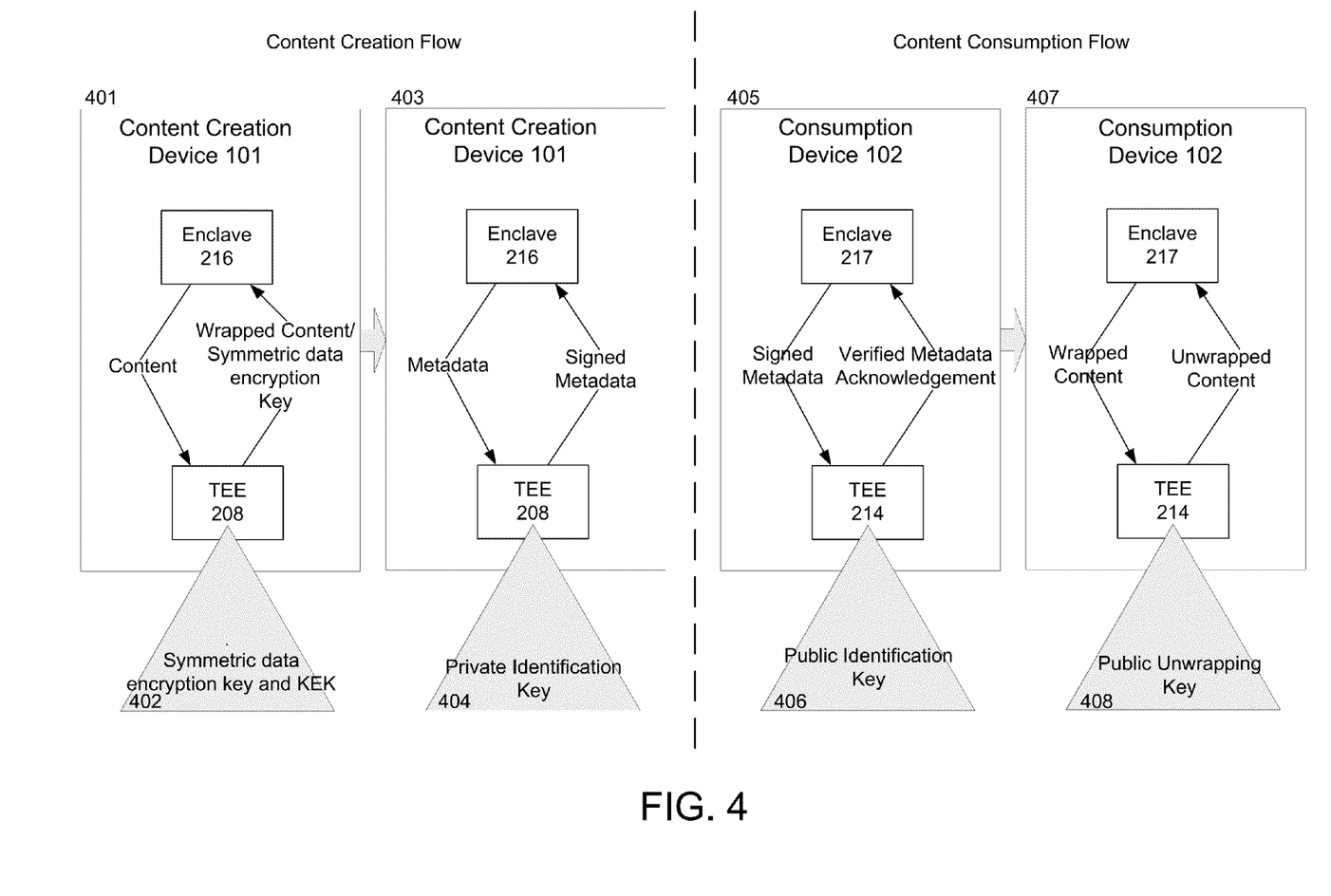
FIG. 4 illustrates exemplary operations that may occur during the creation of diverse content and the consumption of diverse content, consistent with non-limiting embodiments of the present disclosure.

Reference is now made to FIG. 4, which diagrammatically illustrates an exemplary content creation flow and an exemplary content consumption flow in accordance with the present disclosure. As may be understood, the content creation flow may occur on a content creation device, whereas a content consumption flow may occur on a consumption device. As shown, the content creation flow may begin with block 401, wherein diverse content is provided from memory enclave 216 to TEE 208 of content creation device 101. In this exemplary flow, TEE 208 stores a symmetric data encryption key and a private key encryption key (KEK), as illustrated by triangle 402. TEE 208 uses the symmetric data encryption key to encrypt the diverse content provided from enclave 216, and the resulting wrapped (encrypted) content is returned to memory enclave 216. TEE 208 also uses the private KEK to wrap (encrypt) the symmetric data encryption key, and the resulting wrapped symmetric data encryption key is returned to memory enclave 216. At this or any subsequent point, the wrapped data encryption key may be exchanged with a consumption device (including consumption device 102), e.g., using Diffie-Hellmann or another asymmetric key exchange protocol.

At block 403, metadata including one or more RM labels applying to all or a portion of the diverse content may be supplied from memory enclave 216 to TEE 208. In this embodiment, TEE 208 stores a private identification key (e.g., a DAA private key, a EPID private key, or the like), which may have been previously supplied to TEE 208. TEE 208 uses the private identification key to sign the metadata, and the resulting signed metadata is returned to memory enclave 216. At this point, the content creation device may package the encrypted diverse content and the signed metadata for output, e.g., by generating a data structure encapsulating the encrypted diverse content and signed metadata, as previously described. In some embodiments, the content creation device generates such a data structure while the encrypted diverse content and signed metadata are stored in memory enclave 216. Alternatively or additionally, the encrypted diverse content and signed metadata may be supplied to TEE 208 for encapsulation in a data structure. Once created, such a data structure may be output using any suitable mechanism to third party devices, including but not limited to consumption device 102.

Turning to the exemplary consumption flow, consumption of the aforementioned data structure(s) by consumption device 102 begins at block 405. Data structures received by a consumption device may be stored in memory enclave 217. Signed metadata in the data structure may be supplied from memory enclave 217 to TEE 214 of consumption device 102. As shown by triangle 406, in this embodiment TEE 214 stores a public identification key (e.g., a DAA public key, an EPID public key, and the like) that corresponds to the private identification key used by TEE 208 to sign the metadata. TEE 214 may use the public identification key to verify the authenticity of the signed metadata, as previously described. If verification fails, TEE 214 (or another component of consumption device 102) may terminate the data consumption flow. But if verification succeeds, TEE 214 may send a verified metadata acknowledgement to memory enclave 217, as illustrated in block 405.

If the verification succeeds, the data consumption flow may proceed to block 407, wherein wrapped content stored in memory enclave 217 (e.g., as part of a data structure) may be provided to TEE 214 for decrypting (unwrapping). Unwrapping may begin by decrypting the symmetric key that TEE 208 used to encrypt the diverse content. As noted previously, the wrapped (encrypted) data encryption key was previously provided to consumption device 102, e.g., using an asymmetric key exchange protocol. In this embodiment, TEE 214 stores a public unwrapping key (as shown by triangle 408) that corresponds to the private KEK used by TEE 208 to encrypt the symmetric data encryption key. TEE 214 may use the public unwrapping key to decrypt the encrypted data encryption key, e.g., using an asymmetric encryption/decryption protocol. In this way, TEE 214 may obtain a decrypted copy of the symmetric data encryption key. TEE 214 may then use the decrypted symmetric data encryption key to unwrap the encrypted diverse content, e.g., using a symmetric encryption/decryption protocol. The decrypted (unwrapped) diverse content may then be returned to enclave 217 for consumption, as shown in block 407.

Another aspect of the present disclosure relates to methods for labeling diverse content and methods for consuming diverse content. With respect to the former, reference is made to FIG. 5, which is a flow diagram of an exemplary diverse content labeling method consistent with the present disclosure. As shown, content labeling method 500 begins at block 501. At block 502, diverse content is generated or otherwise provided. As noted previously, the diverse content may be stored in a secure location, such as a memory enclave. However, storage of the diverse content in such an enclave is not required. Indeed, diverse content may be stored in any suitable memory. Without limitation, diverse content is preferably stored in a memory enclave or other secure location, so as to improve its security and protect it from access by unauthorized computers and/or software.

Figure 5:
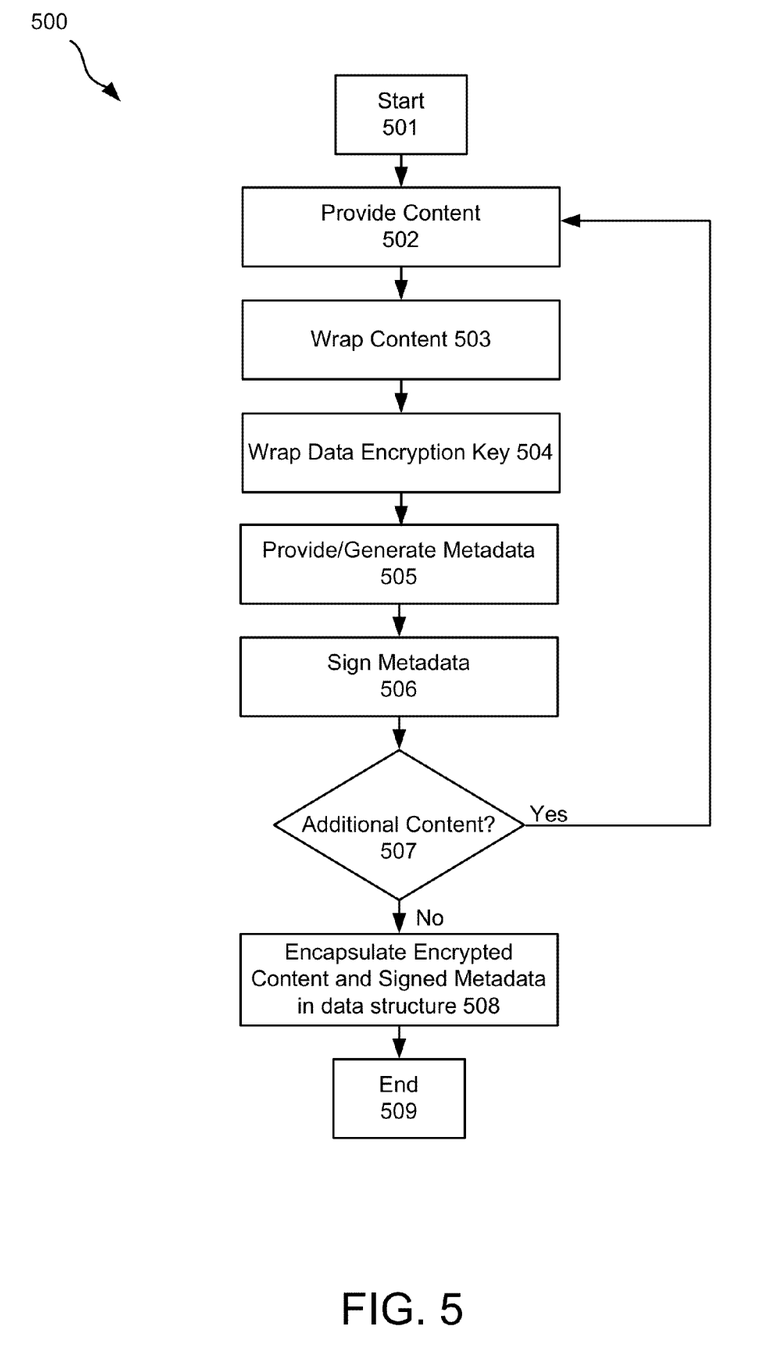
FIG. 5 is a flow diagram of an exemplary diverse content creation method, consistent with non-limiting embodiments of the present disclosure.

The method may then proceed to block 503, wherein the diverse content is wrapped (encrypted). As noted previously, wrapping of the diverse data may occur using any suitable data encryption protocol, including symmetric and asymmetric data encryption protocols. Without limitation, the data wrapping process preferably occurs using a symmetric data encryption protocol using one or more symmetric data encryption keys, as previously explained.

The method may then progress to block 504, wherein the data encryption key used to wrap the diverse content is encrypted. As noted previously, encryption of the data encryption key may occur using any suitable key encryption process. Without limitation, the data encryption key is preferably encrypted using an asymmetric key encryption protocol, e.g., where a private key encryption key (KEK) is used to encrypt the data encryption key. In such instances, the resulting encrypted (wrapped) data encryption key may later be unwrapped (e.g., by a consumption device) using a corresponding public key. The encrypted data encryption key may be provided to other devices (e.g., consumption devices) using any suitable key exchange protocol, including but not limited to Diffie-Hellmann and other asymmetric key exchange protocols. The method may then proceed to block 505.

At block 505, metadata describing the diverse content may be generated or otherwise provided. The metadata may include information about the diverse content, including one or more RM labels describing all or a portion of the diverse content. Without limitation, the metadata preferably includes one or more RM labels that attribute all or a portion of the diverse content to one or more authors. As noted previously, metadata generation may occur in a secure location, e.g., in a memory enclave, a TEE, etc. of a content creation device. While metadata generation in such locations may afford increased security, metadata may of course be generated and/or provided in another manner. For example, metadata may be generated or otherwise provided in unsecure memory of a content creation device, e.g., in system random access memory, in a memory local to a general purpose processor of a content creation device, another memory, combinations thereof and the like. The method may then proceed to block 506.

At block 506, the metadata may be signed by a content creation device with an electronic signature. Without limitation, the electronic signature is preferably a signature that may be independently verified by a third party device, such as a consumption device. By "independently verified," it is meant that a third party device can verify the authenticity of the electronic signature without reliance on a third party verifier (e.g., an authentication server), and without having to establish a secure connection with the device that generated the metadata, e.g., a content creation device. In some embodiments, the metadata is signed using a DAA private key, an EPID private key, combinations thereof, and the like. Without limitation, the metadata is preferably signed with a EPID private key.

The method may then proceed to block 507, wherein a determination is made as to whether there is additional content that needs to be encrypted or otherwise processed. If so, the method returns to block 502, and proceeds as previously described for the additional content. If not, the method proceeds to block 508.

At block 508, the encrypted diverse content and signed metadata are encapsulated in a data structure using any suitable process, as previously described. For example, data structures encapsulating the encrypted diverse content and signed metadata may be formed using a uniform resource identifier (URI) protocol (scheme), uniform resource name (URN) protocol (scheme), combinations thereof, and the like. In such instances, the URN/URI namespace may identify the entity responsible for defining the data structure. As may be appreciated, URN/URI names can be nested within the diverse content metadata structures so that data structure nesting may occur without artificial termination. At block 509, the diverse content labeling method ends.

Figure 6:
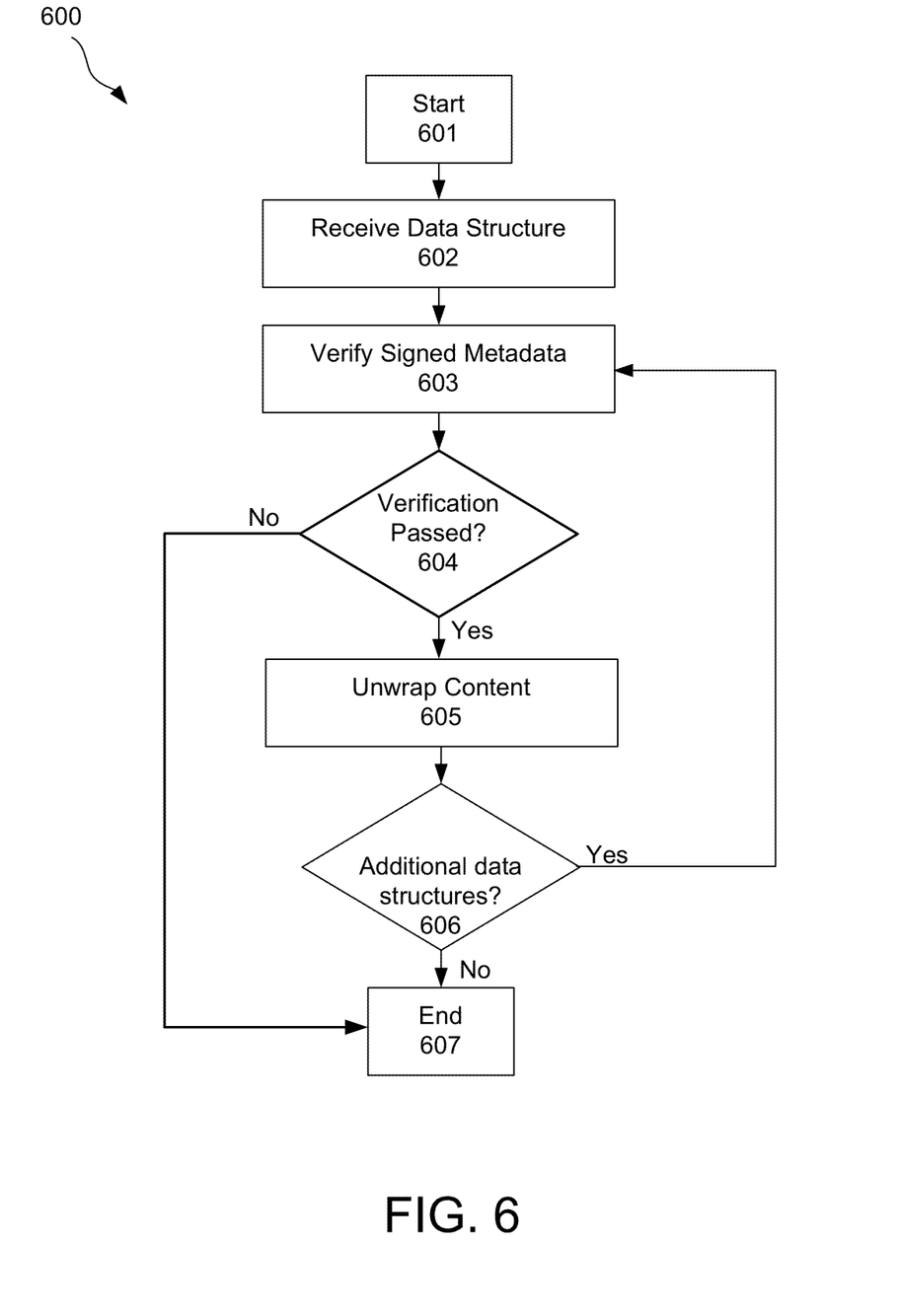
FIG. 6 is a flow diagram of an exemplary content consumption method, consistent with non-limiting embodiments of the present disclosure.

Turning to FIG. 6, an exemplary content consumption method is illustrated. As shown, content consumption method 600 begins at block 601. At block 602, a consumption device receives a data structure that was produced by a content creation device, e.g., according to method 500 of FIG. 5. As described previously, data structures received by a consumption device may be stored in a secure location, such as a memory enclave, a TEE, combinations thereof, and the like. Of course, data structures received by a content consumption device need not be stored in a secure location, and may be stored in any suitable location within a consumption device. For example, data structures may be stored within unsecured memory of a consumption device, such as system random access memory, memory local to a general purpose processor, another memory, combinations thereof, and the like.

Regardless of where the data structure is stored, the method may proceed to block 603, wherein the authenticity of signed metadata in the data structure is verified. As explained previously, the authenticity of the signed metadata may be verified using any suitable authentication protocol. Without limitation, verification of the authenticity of signed metadata preferably occurs without having to establish a secure connection with the system that produced the signature (e.g. a content creation device) and/or without the use of a third party verification system (e.g., a verification server). For example, verification of the signed metadata's authenticity may occur using a DAA or EPID protocol, as previously described. In the latter case, verification of the authenticity of the signed metadata may occur through the use of an EPID public key corresponding to an EPID private key used by a content creation device to sign the metadata, as previously described.

The method may then proceed to block 604, where a determination is made as to whether verification of the signed metadata succeeded or failed. If verification failed, the process proceeds to block 607, whereupon the method ends. If verification succeeded, the process may proceed to block 605 whereupon encrypted (wrapped) content in the data structure is decrypted (unwrapped). As previously described, decryption of the encrypted content may begin with the decryption of the data encryption key(s) that was (were) used to encrypt the encrypted content. Decryption of such data encryption key(s) may occur via any suitable process, such as an asymmetric encryption/decryption process. For example, if the data encryption key is encrypted with a private key encryption key (KEK, e.g., by a content creation device), decryption of the encrypted data encryption key may occur using a public key corresponding to the private KEK). Regardless of how the encrypted data encryption key is decrypted, decryption of the encrypted content may proceed using the decrypted data encryption key. The method may then proceed to block 606.

At block 606, a determination may be made as to whether additional data structures containing diverse content and/or metadata are available for processing. If not, the method may proceed to block 607, whereupon the consumption method ends. But if so, the method may return (loop back) to block 603, whereupon the authenticity of the metadata of the additional data structure is verified. The method then proceeds through blocks 604-606 for the additional data structure, as previously described. As may be appreciated, looping of consumption method 600 in this manner may be useful in instances where a data structure encapsulates one or more other data structures (e.g., nested data structures), as well as additional content, e.g., as shown in data structure 303 of FIG. 3. Using data structure 303 as an example, method 600 may proceed by first verifying metadata 304 and then unwrapping data structure 301, content D, and content E (which may all be encrypted with a symmetric data encryption key or another data encryption key), as previously described. The method may then loop back to block 604, wherein the authenticity of metadata 302 (in data structure 301) is verified, followed by unwrapping content A, content B, and content C (which are also contained in data structure 301).

In some embodiments, metadata 302 and metadata 304 may be signed with respective private identification keys (e.g., unique EPID/DAA private keys) which may be independently verified with a common public identification key (e.g., the same EPID/DAA public key). Moreover, content A, B, and C may be encrypted with a first data encryption key and content D and E and data structure 301 may be encrypted with a second data encryption key, wherein the first and second data encryption keys may be decrypted using a common public key. In this way, a single public identification key (e.g., a Single EPID/DAA public key) may be used to verify the authenticity of all signed metadata in a data structure. Likewise, a single public key may be used to decrypt all content in a data structure. As may be appreciated, this can alleviate the need to store individual keys for each piece of metadata and each piece of encrypted content on a consumption device.

Accordingly, one example of the present disclosure is a content creation device. The content creation device includes a processor, a memory, and a metadata generation module having computer readable metadata generation instructions (MGI) stored therein. The MGI instructions when executed by the processor cause the content creation device to perform the following operations including: encrypt diverse content stored in the memory, thereby generating encrypted diverse content; generate metadata including a rights management label applying to the diverse content, the rights management label attributing all or a portion of the diverse content to one or more authors; sign the metadata with an independently verifiable electronic signature, thereby producing signed metadata; encapsulate the signed metadata and the encrypted diverse content in a data structure; and store the data structure in the memory.

Another exemplary content creation device according to the present disclosure includes any or all of the foregoing components, wherein the memory includes a memory enclave in which the diverse content, metadata, and data structure are stored.

Another exemplary content creation device according to the present disclosure includes any or all of the foregoing components, and further includes a trusted execution environment (TEE). In this example, the MGI instructions when executed further cause the content creation device to: provide the diverse content from the memory to the TEE; encrypt the diverse content within the TEE, thereby producing the encrypted diverse content; provide the metadata to the TEE; and sign the metadata with the independently verifiable electronic signature in the TEE.

Another exemplary content creation device according to the present disclosure includes any or all of the foregoing components, wherein the independently verifiable electronic signature is selected from the group consisting of a direct autonomous attestation private key, an enhanced privacy identification key, and combinations thereof.

Another exemplary content creation device according to the present disclosure includes any or all of the foregoing components, wherein the diverse content is encrypted using at least one data encryption key.

Another exemplary content creation device according to the present disclosure includes any or all of the foregoing components, and further includes a trusted execution environment (TEE), wherein the MGI instructions when executed further cause the content creation device to: provide the diverse content from the memory enclave to the TEE; encrypt the diverse content within the TEE, thereby producing the encrypted diverse content; provide the metadata from the memory enclave to the TEE; sign the metadata with the independently verifiable electronic signature within the TEE; encapsulate the encrypted diverse content and the signed metadata in a data structure within the TEE; and output the data structure to the memory enclave.

Another exemplary content creation device according to the present disclosure includes any or all of the foregoing components, wherein the MGI instructions when executed by the processor further cause the content creation device to: encrypt the data encryption key with a private key exchange key, thereby producing a wrapped data encryption key that may be decrypted using a public key corresponding to said private key encryption key; and exchange the wrapped data encryption key with a consumption device using a key exchange protocol.

Another example of the present disclosure relates to a consumption device. The consumption device includes a processor; a memory; and a metadata verification module having computer readable metadata verification instructions (MVI) stored therein. The MVI instructions when executed by the processor cause the consumption device to, in response to receiving a data structure comprising encrypted diverse content and metadata signed with an independently verifiable electronic signature, perform the following operations including: verify the authenticity of the electronic signature; if the authenticity of the electronic signature cannot be verified, reject the data structure; and if the authenticity of the electronic signature is verified, decrypt the encrypted diverse content.

Another exemplary consumption device according to the present disclosure includes any or all of the foregoing components, wherein the independently verifiable electronic signature comprises at least one private identification key, and the MVI instructions when executed by the processor causes the consumption device to verify the authenticity of the electronic signature using a public identification key corresponding to the private identification key.

Another exemplary consumption device according to the present disclosure includes any or all of the foregoing components, wherein the private key comprises a direct autonomous authentication (DAA) private key, an enhanced privacy identification (EPID) private key, or a combination thereof, and the MVI instructions when executed by the processor cause the consumption device to verify the authenticity of the electronic signature using a DAA public key, EPID key, or a combination thereof that corresponds to the DAA private key, EPID private key, or combination thereof.

Another exemplary consumption device according to the present disclosure includes any or all of the foregoing components, and further includes a trusted execution environment (TEE) including the public key, wherein the MVI instructions when executed by the processor cause the consumption device to perform the following operations comprising: provide the metadata to the TEE; and verify within the TEE the authenticity of the electronic signature using the public key.

Another exemplary consumption device according to the present disclosure includes any or all of the foregoing components, wherein the encrypted diverse content includes diverse content that was encrypted with at least one data encryption key, the MVI instructions when executed by the processor further cause the consumption device to: receive a wrapped data encryption key using a key exchange protocol, the wrapped data encryption key including a copy of the data encryption key as encrypted by a private key encryption key; decrypt the wrapped data encryption key with a public key corresponding to the private key encryption key, thereby obtaining a copy of the data encryption key; and decrypt the encrypted diverse content with the copy of the data encryption key.

Another exemplary consumption device according to the present disclosure includes any or all of the foregoing components, wherein the encrypted diverse content includes diverse content that was encrypted with at least one data encryption key, the MVI instructions when executed by the processor further cause the consumption device to: receive a wrapped data encryption key using a key exchange protocol, the wrapped data encryption key including a copy of the data encryption key as encrypted by a private key encryption key; decrypt the wrapped data encryption key in the TEE, the TEE comprising a public key corresponding to the private key encryption key, thereby obtaining a copy of the data encryption key; and decrypt the encrypted diverse content in the TEE with the copy of the data encryption key.

Another example of the present disclosure is at least one computer readable medium including metadata generation instructions (MGI) stored therein. The MGI instructions when executed by a processor cause the processor to perform the following operations including: encrypt diverse content stored in a memory, thereby generating encrypted diverse content; generate metadata including a rights management label applying to diverse content, the rights management label attributing all or a portion of the diverse content to one or more authors; sign the metadata with an independently verifiable electronic signature, thereby producing signed metadata; and encapsulate the signed metadata and the encrypted diverse content in a data structure.

Another exemplary at least one computer readable medium includes any or all of the foregoing components, wherein the MGI instructions when executed further cause the processor to: store the diverse content, the metadata, and the data structure in a memory enclave.

Another exemplary at least one computer readable medium includes any or all of the foregoing components, wherein the MGI instructions when executed further cause the processor to: provide the diverse content from the memory to a trusted execution environment (TEE); encrypt the diverse content within the TEE, thereby producing the encrypted diverse content; provide the metadata to the TEE; and sign the metadata with the independently verifiable electronic signature in the TEE, thereby producing the signed metadata.

Another exemplary at least one computer readable medium includes any or all of the foregoing components, wherein the independently verifiable electronic signature is selected from the group consisting of a direct autonomous attestation private key, an enhanced privacy identification key, and combinations thereof.

Another exemplary at least one computer readable medium includes any or all of the foregoing components, wherein the MGI instructions when executed further cause the processor to: encrypt the diverse content using at least one data encryption key.

Another exemplary at least one computer readable medium includes any or all of the foregoing components, wherein the MGI instructions when executed further cause the processor to: provide the diverse content from the memory enclave to a trusted execution environment (TEE); encrypt the diverse content within the TEE, thereby producing the encrypted diverse content; provide the metadata from the memory enclave to the TEE; sign the metadata with the independently verifiable electronic signature within the TEE; encapsulate the encrypted diverse content and the signed metadata in a data structure within the TEE; and output the data structure to the memory enclave.

Another exemplary at least one computer readable medium includes any or all of the foregoing components, wherein the MGI instructions when executed further cause the processor to: encrypt the private data encryption key with a private key encryption key, thereby producing a wrapped data encryption key that may be decrypted using a public key corresponding to said private key encryption key; and exchange the wrapped data encryption key with a consumption device using a key exchange protocol.

Another example in accordance with the present disclosure is at least one computer readable medium including metadata verification instructions (MVI) stored therein. The MVI instructions when executed by a processor cause the processor to, in response to receiving a data structure including encrypted diverse content and metadata signed with an independently verifiable electronic signature, perform the following operations comprising: verify the authenticity of the electronic signature; if the authenticity of the electronic signature cannot be verified, reject the data structure; and if the authenticity of the electronic signature is verified, decrypt the encrypted diverse content.

Another exemplary at least one computer readable medium includes any or all of the foregoing components, wherein the independently verifiable electronic signature comprises at least one private identification key, and the MVI instructions when executed by the processor causes the processor to verify the authenticity of the electronic signature using a public identification key corresponding to the private identification key.

Another exemplary at least one computer readable medium includes any or all of the foregoing components, wherein the private identification key includes a direct autonomous authentication (DAA) private key, an enhanced privacy identification (EPID) private key, or a combination thereof, and the MVI instructions when executed by the processor cause the processor to verify the authenticity of the electronic signature using a DAA public key, EPID public key, or a combination thereof that corresponds to the DAA private key, EPID private key, or combination thereof.

Another exemplary at least one computer readable medium includes any or all of the foregoing components, wherein the MVI instructions when executed by the processor cause the processor to: provide the metadata to a trusted execution environment (TEE), the TEE comprising the public identification key; and verify within the TEE the authenticity of the electronic signature using the public identification key.

Another exemplary at least one computer readable medium includes any or all of the foregoing components, wherein the encrypted diverse content includes diverse content that was encrypted with at least one data encryption key, and the MVI instructions when executed by the processor further cause the processor to: receive a wrapped data encryption key using a key exchange protocol, the wrapped data encryption key including a copy of the data encryption key as encrypted by a private key encryption key; decrypt the wrapped data encryption key with a public key corresponding to the private key encryption key, thereby obtaining a copy of the data encryption key; and decrypt the encrypted diverse content with the copy of the data encryption key.

Another exemplary at least one computer readable medium includes any or all of the foregoing components, wherein the encrypted diverse content includes diverse content that was encrypted with at least one data encryption key, and the MVI instructions when executed by the processor further cause the processor to: receive a wrapped data encryption key using a key exchange protocol, the wrapped data encryption key including a copy of the data encryption key as encrypted by a private key encryption key; decrypt the wrapped data encryption key in a trusted execution environment (TEE), the TEE comprising a public key corresponding to the private key encryption key, thereby obtaining a copy of the data encryption key; and decrypt the encrypted diverse content in the TEE with the copy of the data encryption key.

Another example according to the present disclosure is a method. The method includes encrypting diverse content stored in a memory of a content creation device, thereby generating encrypted diverse content; generating metadata including a rights management label applying to the diverse content, the rights management label attributing all or a portion of the diverse content to one or more authors; signing the metadata with an independently verifiable electronic signature, thereby producing signed metadata; encapsulating the signed metadata and the encrypted diverse content in a data structure; and storing the data structure in the memory.

Another exemplary method in accordance with the present disclosure includes any or all of the foregoing components, and further includes storing the diverse content, the metadata, and the data structure in a memory enclave within the memory.

Another exemplary method in accordance with the present disclosure includes any or all of the foregoing components, and further includes providing the diverse content from the memory to a trusted execution environment (TEE); encrypting the diverse content within the TEE, thereby producing the encrypted diverse content; providing the metadata to the TEE; and signing the metadata with the independently verifiable electronic signature in the TEE.

Another exemplary method in accordance with the present disclosure includes any or all of the foregoing components, wherein the independently verifiable electronic signature is selected from the group consisting of a direct autonomous attestation private key, an enhanced privacy identification key, and combinations thereof.

Another exemplary method in accordance with the present disclosure includes any or all of the foregoing components, wherein the encrypting includes encrypting the diverse content using at least one data encryption key.

Another exemplary method in accordance with the present disclosure includes any or all of the foregoing components, and further includes providing the diverse content from the memory enclave to a trusted execution environment (TEE); encrypting the diverse content within the TEE, thereby producing the encrypted diverse content; providing the metadata from the memory enclave to the TEE; signing the metadata with the independently verifiable electronic signature within the TEE; encapsulating the encrypted diverse content and the signed metadata in a data structure within the TEE; and outputting the data structure to the memory enclave.

Another exemplary method in accordance with the present disclosure includes any or all of the foregoing components, and further includes encrypting the data encryption key with a private key encryption key, thereby producing a wrapped data encryption key; and exchanging the wrapped data encryption key with a consumption device using a key exchange protocol.

Another example according to the present disclosure is a method. The method includes, in response to receiving a data structure including encrypted diverse content and metadata signed with an independently verifiable electronic signature with a consumption device: verifying the authenticity of the electronic signature with the consumption device; if the authenticity of the electronic signature cannot be verified, rejecting the data structure; and if the authenticity of the electronic signature is verified, decrypting the encrypted diverse content.

Another exemplary method in accordance with the present disclosure includes any or all of the foregoing components, wherein the independently verifiable electronic signature includes at least one private identification key, and the MVI instructions when executed by the processor causes the consumption device to verify the authenticity of the electronic signature using a public identification key corresponding to the private identification key.

Another exemplary method in accordance with the present disclosure includes any or all of the foregoing components, wherein the private identification key includes a direct autonomous authentication (DAA) private key, an enhanced privacy identification (EPID) private key, or a combination thereof, and the MVI instructions when executed by the processor cause the consumption device to verify the authenticity of the electronic signature using a DAA public key, EPID public key, or a combination thereof that corresponds to the DAA private key, EPID private key, or combination thereof.

Another exemplary method in accordance with the present disclosure includes any or all of the foregoing components, and further includes a trusted execution environment (TEE) including the public key, wherein the MVI instructions when executed by the processor cause the consumption device to perform the following operations including: providing the metadata to a trusted execution environment (TEE) including the public identification key; and verifying within the TEE the authenticity of the electronic signature using the public identification key.

Another exemplary method in accordance with the present disclosure includes any or all of the foregoing components, wherein the encrypted diverse content includes diverse content that was encrypted with at least one data encryption key, and the method further includes: receiving a wrapped data encryption key using a key exchange protocol, the wrapped data encryption key including a copy of the data encryption key as encrypted by a private key encryption key; decrypting the wrapped data encryption key with a public key corresponding to the private key encryption key, thereby obtaining a copy of the data encryption key; and decrypting the encrypted diverse content with the copy of the data encryption key.

Another exemplary method in accordance with the present disclosure includes any or all of the foregoing components, wherein the encrypted diverse content includes diverse content that was encrypted with at least one data encryption key, and the method further includes: receiving a wrapped data encryption key using a key exchange protocol, the wrapped data encryption key including a copy of the data encryption key as encrypted by a private key encryption key; decrypting the wrapped data encryption key in the TEE, the TEE including a public key corresponding to the private key encryption key, thereby obtaining a copy of the data encryption key; and decrypting the encrypted diverse content in the TEE with the copy of the data encryption key.

Another example in accordance with the present disclosure is a system. The system includes a content creation device and a consumption device. The content creation device includes a first processor and a first memory having computer readable metadata generation instructions (MGI) stored therein. The consumption device includes a second processor and a second memory having computer readable metadata verification instructions (MVI) stored therein. The MGI instructions and the MVI instructions when executed by the first and second processors respectively, cause one or both of the content creation device and the consumption device to: exchange a data structure including encrypted diverse content and metadata, the metadata being signed with an independently verifiable electronic signature and including at least one rights management label applying to the diverse content and attributing all or a portion of the diverse content to at least one author; exchange a wrapped data encryption key in a key exchange protocol, the wrapped data encryption key including a data encryption key used to encrypt the encrypted data, as encrypted by a private key encryption key unique to the content creation device; unwrap the wrapped data encryption key using a public key corresponding to the private key encryption key, thus obtaining a copy of the data encryption key; and decrypt the encrypted data using the copy of the data encryption key.

Another exemplary system in accordance with the present disclosure includes any or all of the foregoing components, wherein the first memory includes a first memory enclave, the first memory includes a first memory enclave and the content creation device further includes a first trusted execution environment (TEE). In such instances, the MGI instructions when executed by the first processor cause the content creation device to: provide diverse data stored in the first memory to the first TEE; and encrypt the diverse content in the first TEE with the data encryption key, thereby producing the encrypted diverse content.

Another exemplary system in accordance with the present disclosure includes any or all of the foregoing components, wherein the consumption device includes a second TEE, and the MVI when executed by the second processor cause the consumption device to: provide the encrypted diverse content to the second TEE; and unwrap the encrypted diverse content in the second TEE, using the copy of the data encryption key.

Another exemplary system in accordance with the present disclosure includes any or all of the foregoing components, wherein the first TEE includes a private identification key that may be independently authenticated with a corresponding public identification key, and the MGI instructions when executed by the first processor cause the content creation device to sign the metadata in the first TEE using the private identification key, thereby producing the metadata signed with an independently verifiable electronic signature.

Another exemplary system in accordance with the present disclosure includes any or all of the foregoing components, wherein the consumption device includes a second TEE, the second TEE including a public identification key corresponding to the private identification key. In such instances, the MVI instructions when executed by the second processor cause the consumption device to verify within the second TEE the authenticity of the signed metadata using the public identification key.

Another exemplary system in accordance with the present disclosure includes any or all of the foregoing components, wherein the private identification key is selected from the group consisting of a direct autonomous attestation (DAA) private key, an enhanced privacy identification (EPID) private key, and combinations thereof, and the public identification key is selected from the group consisting of a DAA public key, an EPID public key, and combinations thereof.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A content creation device, comprising:
a processor;
a memory; and
a metadata generation module having computer readable metadata generation instructions (MGI) stored therein, wherein said MGI instructions when executed by said processor cause said content creation device to perform the following operations comprising:
encrypt first diverse content stored in said memory, thereby generating encrypted first diverse content;
generate first metadata including a first rights management label applying to said first diverse content, said first rights management label attributing all or a portion of said first diverse content to one or more authors;
sign said first metadata with an independently verifiable electronic signature, thereby producing signed first metadata;
encapsulate said signed first metadata and said encrypted first diverse content in a first data structure;
generate second metadata including a second rights management label attributing all or a portion of second diverse content stored in said memory to one or more authors; and
encapsulate said first data structure, said second diverse content, and said second rights management label in a second data structure.

2. The content creation device of claim 1, wherein said memory includes a memory enclave, wherein said first diverse content, said first metadata, and said first data structure are stored in said memory enclave.

3. The content creation device of claim 1, further comprising a trusted execution environment (TEE), wherein said MGI instructions when executed further cause said content creation device to:
provide said first diverse content from said memory to said TEE;
encrypt said first diverse content within said TEE, thereby producing said encrypted first diverse content;
provide said first metadata to said TEE; and
sign said first metadata with said independently verifiable electronic signature in said TEE.

4. The content creation device of claim 1, wherein said independently verifiable electronic signature is selected from the group consisting of a direct autonomous attestation private key, an enhanced privacy identification key, and combinations thereof.

5. The content creation device of claim 1, wherein said first diverse content is encrypted using at least one data encryption key.

6. The content creation device of claim 2, further comprising a trusted execution environment (TEE), wherein said MGI instructions when executed further cause said content creation device to:
provide said first diverse content from said memory enclave to said TEE;
encrypt said first diverse content within said TEE, thereby producing said encrypted first diverse content;
provide said first metadata from said memory enclave to said TEE;
sign said first metadata with said independently verifiable electronic signature within said TEE;
encapsulate said encrypted first diverse content and said signed first metadata in a data structure within said TEE; and
output said data structure to said memory enclave.

7. The content creation device of claim 5, wherein said MGI instructions when executed by said processor further cause said content creation device to:
encrypt said data encryption key with a private key exchange key, thereby producing a wrapped data encryption key that may be decrypted using a public key corresponding to said private key encryption key; and
exchange said wrapped data encryption key with a consumption device using a key exchange protocol.

8. At least one non-transitory computer readable medium comprising metadata generation instructions (MGI) stored therein, wherein said MGI instructions when executed by a processor cause said processor to perform the following operations comprising:

encrypt first diverse content stored in a memory, thereby generating encrypted first diverse content;

generate first metadata including a first rights management label applying to said first diverse content, said first rights management label attributing all or a portion of said first diverse content to one or more authors;

sign said first metadata with an independently verifiable electronic signature, thereby producing signed first metadata;

encapsulate said signed first metadata and said encrypted first diverse content in a first data structure;

generate second metadata including a second rights management label attributing all or a portion of second diverse content stored in said memory to one or more authors; and encapsulate said first data structure, said second diverse content, and said second rights management label in a second data structure.

9. The at least one non-transitory computer readable medium of claim 8, wherein said MGI instructions when executed further cause said processor to:

store said first diverse content, said first metadata, and said data structure in a memory enclave.

10. The at least one non-transitory computer readable medium of claim 8, wherein said MGI instructions when executed further cause said processor to:

provide said first diverse content from said memory to a trusted execution environment (TEE);

encrypt said first diverse content within said TEE, thereby producing said encrypted first diverse content;

provide said first metadata to said TEE; and sign said first metadata with said independently verifiable electronic signature in said TEE, thereby producing said signed first metadata.

11. The at least one non-transitory computer readable medium of claim 8, wherein said independently verifiable electronic signature is selected from the group consisting of a direct autonomous attestation private key, an enhanced privacy identification key, and combinations thereof.

12. The at least one non-transitory computer readable medium of claim 8, wherein said MGI instructions when executed further cause said processor to:

encrypt said first diverse content using at least one data encryption key.

13. The at least one non-transitory computer readable medium of claim 9, wherein said MGI instructions when executed further cause said processor to:

provide said first diverse content from said memory enclave to a trusted execution environment (TEE);

encrypt said first diverse content within said TEE, thereby producing said encrypted first diverse content;

provide said first metadata from said memory enclave to said TEE;

sign said first metadata with said independently verifiable electronic signature within said TEE;

encapsulate said encrypted first diverse content and said signed first metadata in a data structure within said TEE; and output said first data structure to said memory enclave.

14. The at least one non-transitory computer readable medium of claim 12, wherein said MGI instructions when executed further cause said processor to:

encrypt said data encryption key with a private key encryption key, thereby producing a wrapped data encryption key that may be decrypted using a public key corresponding to said private key encryption key; and exchange said wrapped data encryption key with a consumption device using a key exchange protocol.

* * * * *